(12) United States Patent
Kim et al.

(10) Patent No.: US 6,240,082 B1
(45) Date of Patent: May 29, 2001

(54) ROUTER FOR DAISY-CHAINED COMPONENTS

(75) Inventors: Chang H. Kim, Whippany; Mark H. Kraml, Flanders, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/037,367

(22) Filed: Mar. 10, 1998

(51) Int. Cl.[7] .................................................. H04B 7/216
(52) U.S. Cl. ......................... 370/342; 370/397; 370/401
(58) Field of Search ................................. 370/342, 335, 370/320, 352, 395, 419, 397, 401, 404; 375/206, 208, 200, 349; 455/450, 466, 557; 716/6, 16

(56) References Cited

U.S. PATENT DOCUMENTS

| 5,432,907 | * | 7/1995 | Picazo et al. ........................ 370/401 |
| 5,544,164 | * | 8/1996 | Baran .................................... 370/397 |
| 5,648,913 | * | 7/1997 | Bennett et al. ......................... 716/6 |
| 5,710,768 | * | 1/1998 | Ziv et al. .............................. 370/342 |

* cited by examiner

Primary Examiner—Wellington Chin
Assistant Examiner—Prenell Jones
(74) Attorney, Agent, or Firm—Steve Mendelsohn

(57) ABSTRACT

Each link between components connected in a daisy-chain configuration is also connected to a special router that can be configured to bypass any one or more of the components. In this way, one or more failed components can be isolated from the daisy-chain configuration without affecting the ability of the other operational components to continue to operate properly. In one embodiment, the special router has a configuration of horizontal and vertical switches and delay nodes. The switches can be independently and selectively controlled to isolate one or more of the components from the daisy-chain configuration, while the delay nodes delay transmission of the signals to simulate the processing time of the bypassed components. In this way, interference with the processing of the remaining operational components can be minimized. In a mobile telecommunications application where each component is a cell-site modem (CSM) of a base station responsible for communications with a different assigned mobile unit, a single-point CSM failure can be detected and isolated in real time without adversely affecting the ability of the remaining operational CSMs to continue to operate, even without interrupting active support of current calls.

13 Claims, 4 Drawing Sheets

ROUTER FOR DAISY-CHAINED COMPONENTS

BACKGROUND OF THE INVENTION

1. Field of the Invention

The present invention relates to electrical components for telecommunication systems.

2. Description of the Related Art

In a typical mobile telecommunication system, communication coverage is provided by base stations strategically located over the overall system coverage region. Each base station supports communications with the mobile units currently located within its coverage area. Forward-link signals intended for the various mobile units located within the base station coverage area are combined for transmission from the base station as a single combined forward-link signal. The individual mobile units receive and process the combined signal to extract only the appropriate corresponding signal. For example, in a code division multiple access (CDMA) telecommunication system, the signals for different mobile units are distinguished by unique Walsh codes that are used to encode the various signals. Each Walsh code corresponds to a different channel. Channels are dynamically assigned to individual mobile units within the coverage area as they are needed to support communications between the base station and the mobile units. In conventional CDMA systems, all of the processing (e.g., encoding, modulation, demodulation, decoding) for each different channel is handled by a separate component called a cell-site modem (CSM) located at the base station. Each CSM handles a different CDMA channel.

In a typical CDMA system, each cell site (or cell-site sector) can support up to 64 different channels. As such, a base station can be configured with up to 64 different CSMs, with each CSM assigned to handle a different one of the 64 CDMA channels. For forward-link processing, where all of the forward-link signals for the various CDMA channels are combined for transmission as a single combined forward-link signal, the forward-link signals generated by the different CSMs are combined to form the single combined signal for transmission. One possible base station architecture would have a single adder connected to receive the outputs directly from all of the different CSMs to generate the combined signal for transmission. When there are as many as 64 different CSMs, such an implementation would require a very large adder that makes this architecture undesirable for various reasons (e.g., cost, size, and power consumption).

FIG. 1 shows a block diagram of an alternative forward-link architecture for the various CSMs in a base station of a typical CDMA system. According to the architecture of FIG. 1, N boards are linked together in a daisy-chain configuration (i.e., with the output of each board being added to the output of the immediate downstream board). Within each board are two columns of CSMs 102 with the CSMs of each column linked together in a daisy-chain configuration (i.e., with the output of each CSM being added to the output of the immediate downstream CSM).

At the CSM level, each intermediary CSM in a column (i.e., not the first or last CSM in a column) receives the signal output from the CSM immediately upstream, adds its own signal, and transmits the augmented signal to the CSM immediately downstream. The first CSM in a column simply transmits its own signal to the second CSM. The last CSM in a column receives the signal output from the CSM immediately upstream, adds its own signal, and transmits the resulting signal corresponding to the contributions from all of the CSMs in that column to a special adder 104, which receives the cumulative signals from both columns and generates a cumulative board signal.

The adder in the first board in the board-level daisy chain (i.e., Board 1 in FIG. 1) receives only the two cumulative column signals from that board to generate the cumulative board signal for Board 1. In addition to the two cumulative column signals, the adder in every other board (i.e., Boards 2 to N) also receives the cumulative board signal from the board immediately upstream. As such, the cumulative board signal generated by each board corresponds to the sum of the signals from all of its CSMs plus all of the signals from all of the CSMs in upstream boards. In this way, the signal generated by the adder in the last board in the daisy chain (i.e., Board N) corresponds to the sum of the signals from all of the CSMs in the base station.

Of course, other architectures are also possible. For example, instead of two columns of daisy-chained CSMs per board, a board may have only a single daisy-chain of CSMs or alternatively more than two columns of daisy-chained CSMs. Similarly, the boards need not be daisy-chained together. In an alternative embodiment, all of the board outputs can be combined at a single adder.

The use of daisy-chain connections both at the CSM level (within columns) and/or at the board level (between boards) avoids the need for large, expensive, power-hungry adders to added many different signals together at once. One drawback in the architecture shown in FIG. 1, however, is that it is susceptible to catastrophic single-point failures. In general, at the CSM level, a single-point failure of any given CSM would result in the loss not only of the signal from that CSM, but also of the signals from all upstream CSMs within the same column. In the worst case, if the last CSM in a column were to fail (i.e., break), none of the signals from any of the CSMs in that column would make it to the adder and would therefore be omitted from the final combined signal. Similarly, at the board level, a single-point failure of any given board would result in the loss not only of the signals from that board, but also of the signals from all upstream boards. In the worst case, if Board N in FIG. 1 were to fail, none of the signals from any of the CSMs in the base station would make it to the antenna for transmission.

SUMMARY OF THE INVENTION

The present invention is directed to an architecture that avoids catastrophic results from single-point failures in daisy-chain configurations, such as exists at the CSM level in forward-link processing in a base station of a CDMA communication system.

In one embodiment, the present invention is an apparatus for a communication system. The apparatus has a plurality of components connected by links in a daisy-chain configuration. For each component, (1) if there is an upstream component in the daisy-chain configuration, the component receives a cumulative signal from the upstream component; (2) the component adds its signal to the cumulative signal; and (3) if there is a downstream component in the daisy-chain configuration, the component transmits an augmented signal to a downstream component. The apparatus also has a router connected to the links between of the components, wherein the router is adapted to selectively bypass one or more components in the daisy-chain configuration.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
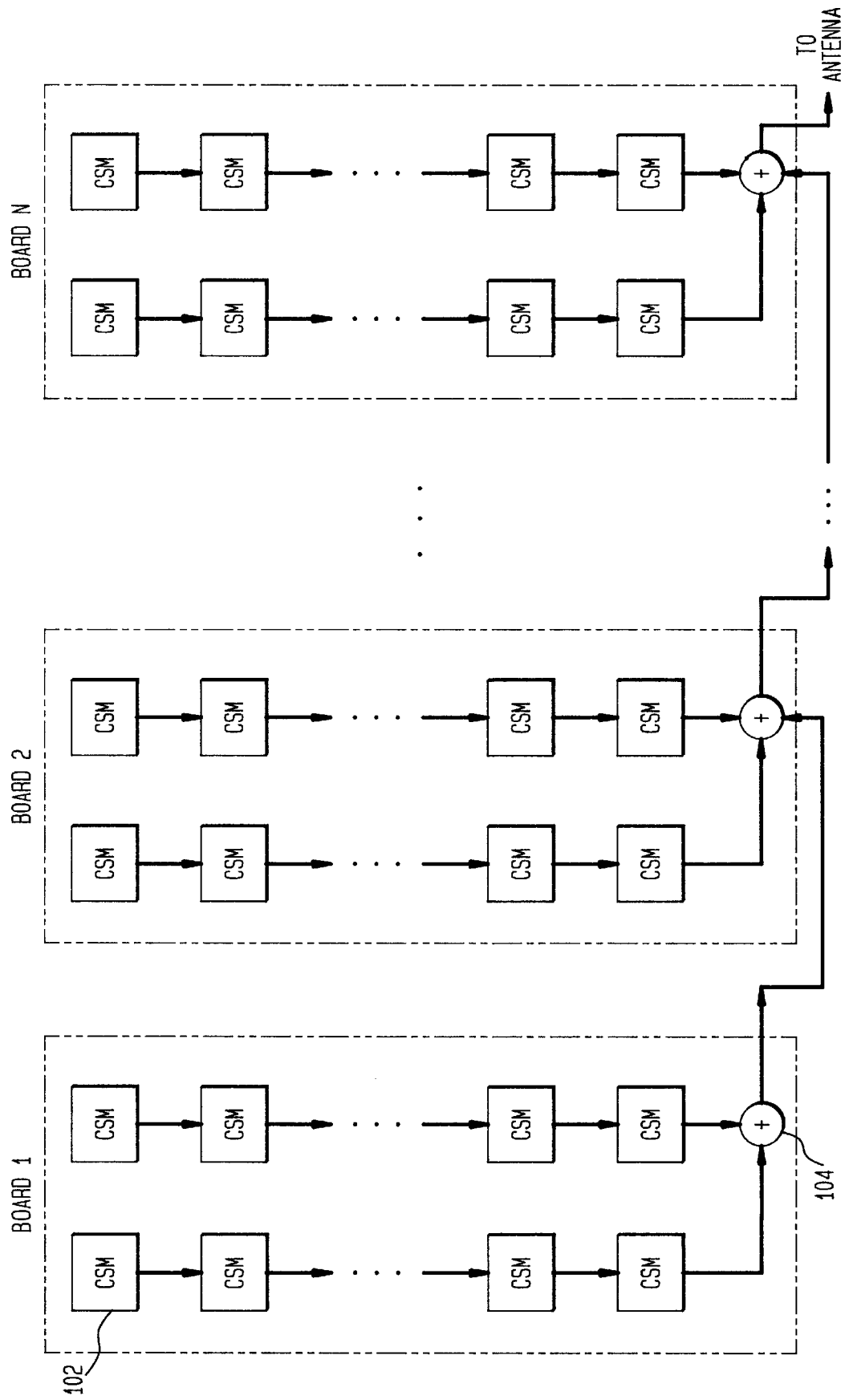
FIG. 1 shows a block diagram of a possible forward-link architecture for the various CSMs in a base station of a typical CDMA system.
Figure 2:
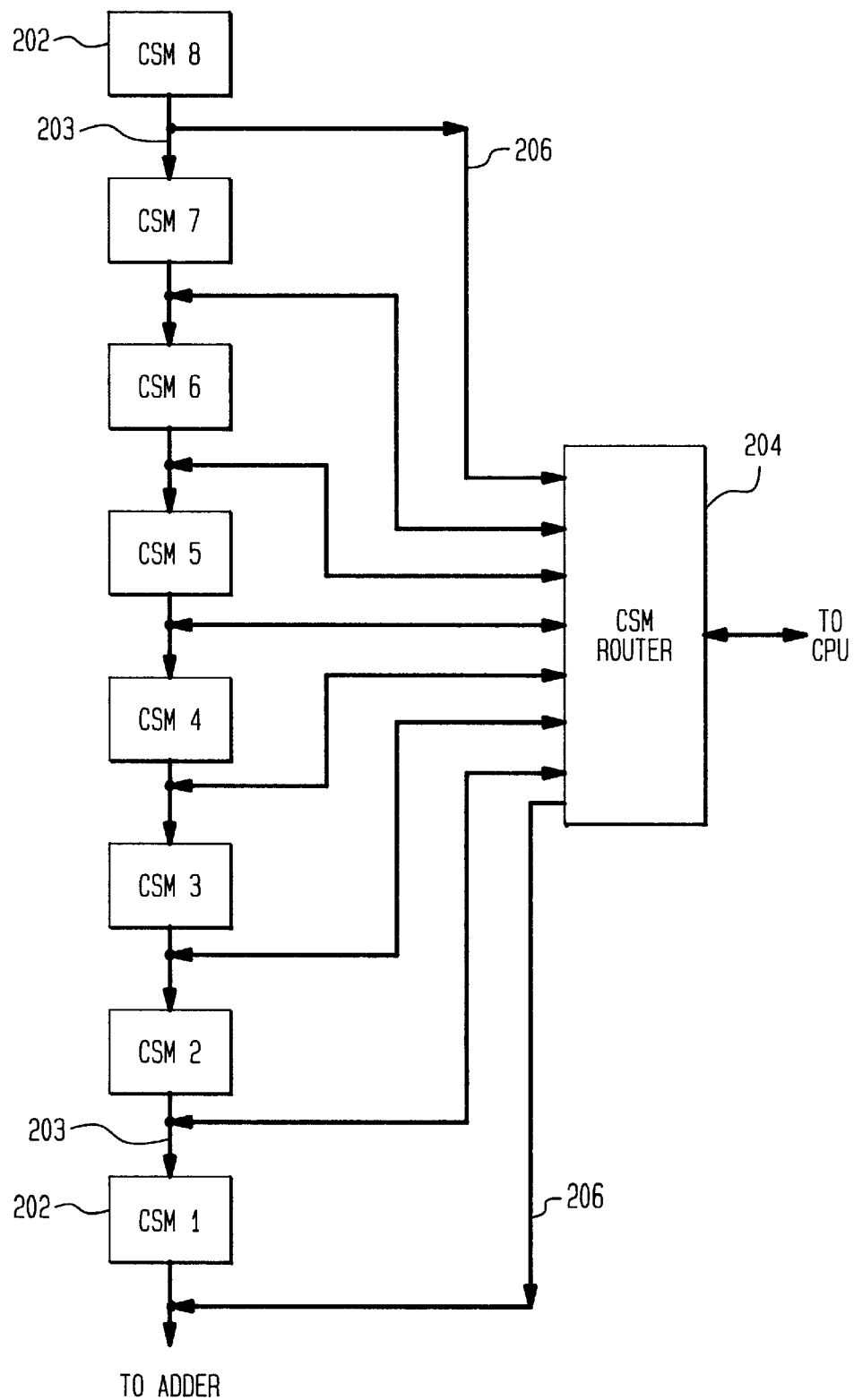
FIG. 2 shows a block diagram of the CSM-level architecture, according to one embodiment of the present invention, that correspond to one column of CSMs in one board of FIG. 1.

FIG. 2 shows a block diagram of the CSM-level architecture, according to one embodiment of the present invention, that correspond to one column of CSMs in one board of FIG. 1. FIG. 2 shows eight CSMs 202 connected one to the next in a daisy-chain configuration by vertical links 203. (That there are eight CSMs in the daisy-chain configuration is exemplary only; the present invention can also be implemented with fewer or more CSMs.) In addition, each vertical link 203 is connected to CSM router 204 via horizontal links 206. CSM router 204 and each CSM 202 also communicate with the board's central processing unit (CPU) (not shown). If one or more of the CSMs breaks or otherwise fails to operate, the CPU configures CSM router 204 to bypass the failed CSMs. In this way, each single-point CSM failure can be selectively isolated from the daisy-chain configuration to prevent the failure from affecting more than just the operations of that one CSM. For example, if CSM 5 in FIG. 2 fails, the signal from CSM 6 (i.e., the CSM immediately upstream of CSM 5) is routed to CSM 4 (i.e., the CSM immediately downstream of CSM 5) via CSM router 204 along the horizontal links 206 immediately above and below CSM 5, thereby bypassing the failed CSM 5.

In the prior art configuration of FIG. 1, a failure in CSM 5 would result in the loss of signals from all of CSMs 5, 6, 7, and 8. According to the present invention, however, a failure in CSM 5 does not affect the signals from CSMs 6, 7, and 8, which continue to get added to the single combined signal that eventually gets transmitted from the base station antenna to the corresponding mobile units.

Figure 3:
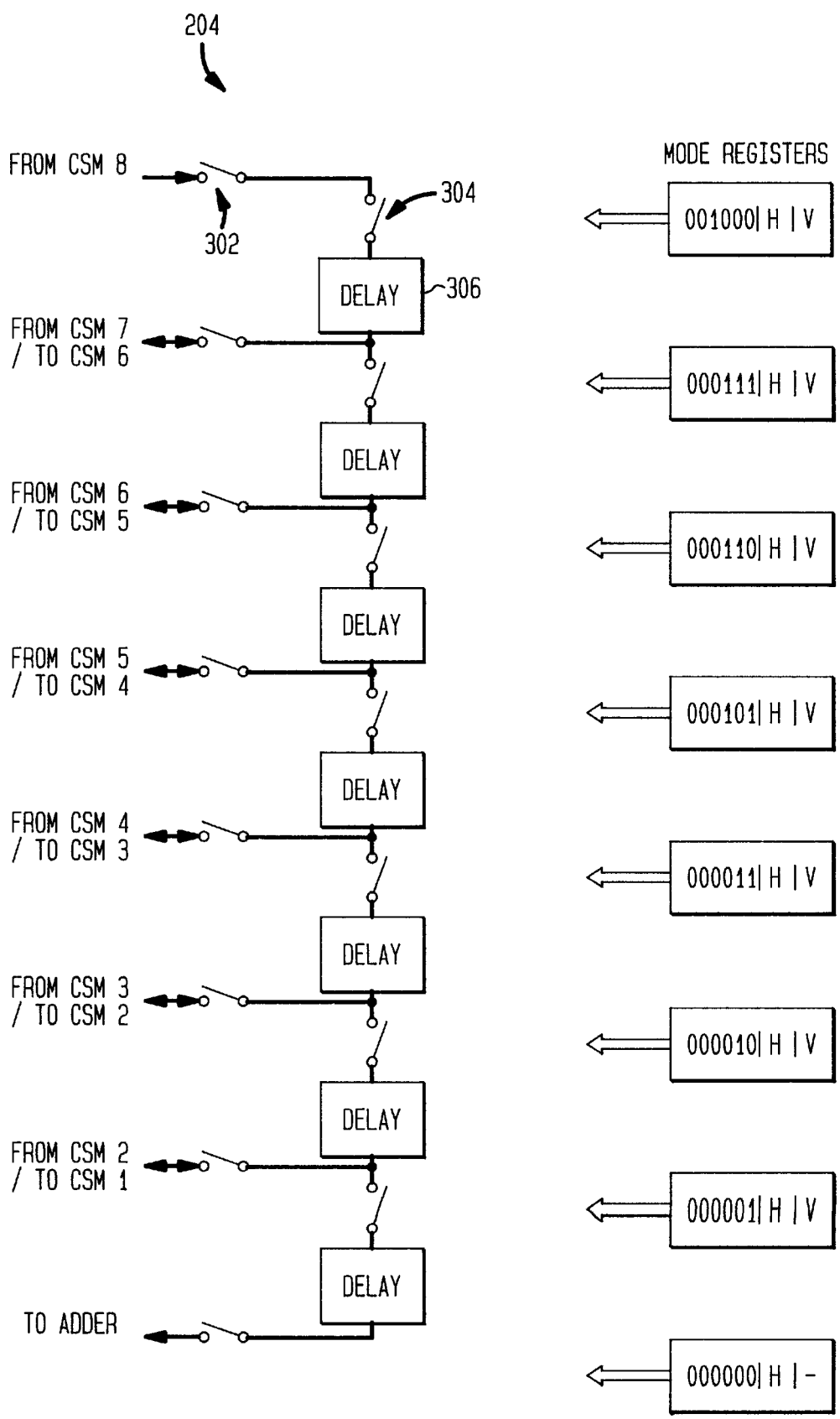
FIG. 3 shows a block diagram of the CSM router of FIG. 2, according to one embodiment of the present invention.

FIG. 3 shows a block diagram of CSM router 204 of FIG. 2, according to one embodiment of the present invention. As shown in FIG. 3, corresponding to each link 203 of FIG. 2 between consecutive CSMs, CSM router 204 has a horizontal switch 302, a vertical switch 304, and a delay module 306. In addition, CSM router 204 has a horizontal switch 302 corresponding to the link following CSM 1. The states of the horizontal and vertical switches are selectively and independently controlled by mode messages received from the CPU, which monitors the status of each CSM 202 to determine whether or not the CSM is operational. Each pair of horizontal and vertical switches has a corresponding mode register for the mode messages. In the embodiment of FIG. 3, each mode message has 8 bits: a 6-bit serial number identifying the set of switches, a horizontal bit identifying the state of the horizontal switch, and a vertical bit identifying the state of the vertical switch.

FIG. 3 shows the configuration of switch states when all of the eight CSMs 202 in FIG. 2 are operational. In this case, all of the horizontal and vertical switches are open and the signals propagate along the normal daisy-chain configuration of CSMs from CSM 8 all the way to CSM 1. In this case, the horizontal and vertical mode-message bits in the mode registers would all be set to 0 indicating that all of the switches are open.

Figure 4:
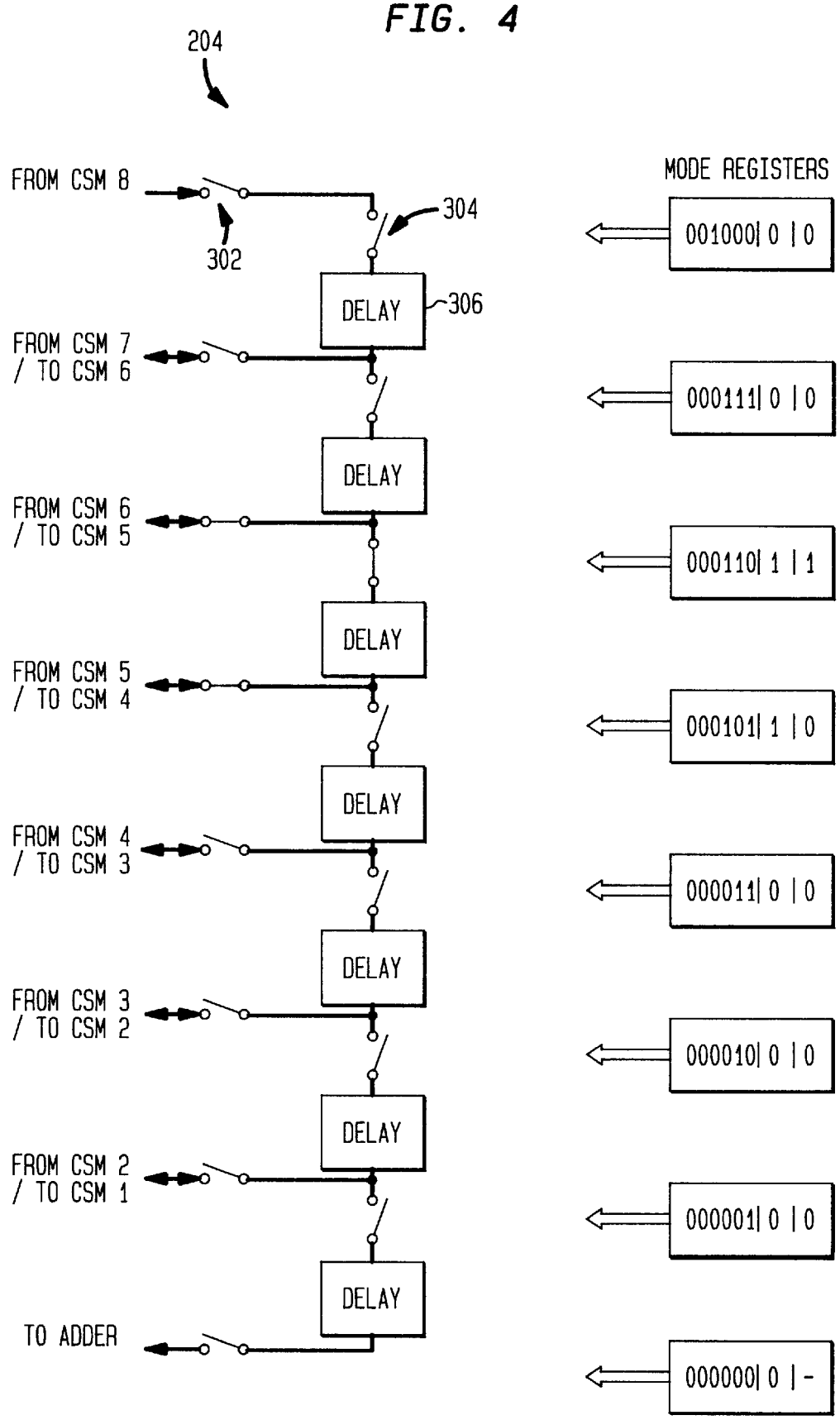
FIG. 4 shows the CSM router of FIG. 3 configured to isolate CSM 5 from the daisy-chain configuration.

FIG. 4 shows the configuration of switch states with CSM 5 isolated from the daisy-chain configuration by CSM router 204. In this case, the horizontal and vertical switches corresponding to the link between CSM 6 and CSM 5 as well as the horizontal switch corresponding to the link between CSM 5 and CSM 4 are closed, while the rest of the switches are open. In this configuration, the signal from CSM 6 is routed via CSM router 204 to CSM 4, thereby bypassing CSM 5.

Those skilled in the art will understand that the states of the switches can be controlled to bypass two or more consecutive CSMs and/or two or more non-consecutive CSMs, as needed.

In one implementation, the CPU monitors the status of all of the CSMs routinely and periodically (e.g., every 1.25 msec). If the CPU detects a CSM failure, it will send the appropriate mode messages to CSM router 204 to change the states of the appropriate horizontal and vertical switches to isolate the failed CSM from the daisy-chain configuration. In this way, single-point CSM failures can be detected in real time and the board can be reconfigured in real time to minimize interference to existing calls being handled by the remaining operational CSMs of the board.

Moreover, for the example of FIG. 4, the delay module corresponding to CSM 5 delays the transmission of the signal received from CSM 6 to CSM 4 by an amount approximately equivalent to the delay that would have been added by the processing of CSM 5 had it been operational and not isolated from the daisy-chain configuration. In this way, the present invention provides automatic timing compensation that avoids having to reinitialize the remaining downstream operational CSMs upon the occurrence of a single-point CSM failure. This means that any existing calls being handled by these operational CSMs can continue uninterrupted.

Although the present invention has been described at the CSM level in the context of a CSM router for a daisy-chain configuration of CSMs for the forward-link processing in a base station of a CDMA communication system, it should be understood that the invention is not so limited. For example, the present invention can be applied to communication systems other than those based on CDMA techniques. The present invention can also be applied to daisy-chain configurations at levels other than the CSM level, such as the daisy-chain configuration that exists at the board level shown in FIG. 1.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for a communication system, comprising:
   (a) a plurality of components connected by links in a daisy-chain configuration, wherein, for each component:
      if there is an upstream component in the daisy-chain configuration, the component receives a cumulative signal from the upstream component;
      the component adds its signal to the cumulative signal; and if there is a downstream component in the daisy-chain configuration, the component transmits an augmented signal to a downstream component; and (b) a router connected to the links between of the components, wherein the router is adapted to selectively bypass one or more components in the daisy-chain configuration, wherein the components are cell-site modems of a base station in a wireless telecommunication system and the signals are forward-link signals.

2. The invention of claim 1, wherein the wireless telecommunication system is a CDMA wireless telecommunication system.

3. The invention of claim 1, wherein the router comprises a plurality of switches configured to selectively isolate the one or more bypassed components from the daisy-chain configuration.

4. The invention of claim 1, wherein the router is adapted to simulate the delay of each of the bypassed components.

5. The invention of claim 1, wherein, for each link between consecutive components in the daisy-chain configuration, the router comprises a horizontal switch, a vertical switch, and a delay module, wherein the horizontal and vertical switches are independently controlled to isolate the one or more bypassed components from the daisy-chain configuration and one or more delay modules simulate the processing delay for the one or more bypassed components.

6. The invention of claim 5, wherein the states of the horizontal and vertical switches are controlled by mode messages, wherein each mode message comprises a plurality of serial number bits to identify a particular link in the daisy-chain configuration, a horizontal control bit to identify the state of the horizontal switch, and a vertical control bit to identify the state of the vertical switch.

7. The invention of claim 6, wherein the components are cell-site modems of a base station in a CDMA mobile telecommunication system and the signals are forward-link signals.

8. An apparatus for a communication system, comprising:

(a) a plurality of components connected by links in a daisy-chain configuration, wherein, for each component:

if there is an upstream component in the daisy-chain configuration, the component receives a cumulative signal from the upstream component;

the component adds its signal to the cumulative signal; and if there is a downstream component in the daisy-chain configuration, the component transmits an augmented signal to a downstream component; and (b) a router connected to the links between of the components, wherein the router is adapted to selectively bypass one or more components in the daisy-chain configuration, wherein, for each link between consecutive components in the daisy-chain configuration, the router comprises a horizontal switch, a vertical switch, and a delay module, wherein the horizontal and vertical switches are independently controlled to isolate the one or more bypassed components from the daisy-chain configuration and one or more delay modules simulate the processing delay for the one or more bypassed components.

9. The invention of claim 8, wherein the components are cell-site modems of a base station in a CDMA wireless telecommunication system and the signals are forward-link signals.

10. The invention of claim 8, wherein the router comprises a plurality of switches configured to selectively isolate the one or more bypassed components from the daisy-chain configuration.

11. The invention of claim 8, wherein the router is adapted to simulate the delay of each of the bypassed components.

12. The invention of claim 8, wherein the states of the horizontal and vertical switches are controlled by mode messages, wherein each mode message comprises a plurality of serial number bits to identify a particular link in the daisy-chain configuration, a horizontal control bit to identify the state of the horizontal switch, and a vertical control bit to identify the state of the vertical switch.

13. The invention of claim 12, wherein the components are cell-site modems of a base station in a CDMA wireless telecommunication system and the signals are forward-link signals.

* * * * *